US012333984B2

(12) United States Patent
Gong

(10) Patent No.: US 12,333,984 B2
(45) Date of Patent: Jun. 17, 2025

(54) DISPLAY DEVICE AND METHOD OF DRIVING SAME

(71) Applicant: LG DISPLAY CO., LTD., Seoul (KR)

(72) Inventor: Hyun Soo Gong, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/381,324

(22) Filed: Oct. 18, 2023

(65) Prior Publication Data

US 2024/0194110 A1 Jun. 13, 2024

(30) Foreign Application Priority Data

Dec. 9, 2022 (KR) ........................ 10-2022-0171816

(51) Int. Cl.
*G09G 3/20* (2006.01)
*G09G 3/3225* (2016.01)

(52) U.S. Cl.
CPC ......... *G09G 3/2007* (2013.01); *G09G 3/3225* (2013.01); *G09G 2320/041* (2013.01); *G09G 2320/0666* (2013.01); *G09G 2320/0673* (2013.01); *G09G 2360/16* (2013.01)

(58) Field of Classification Search
CPC .............................................. G09G 2320/0276
See application file for complete search history.

(56) References Cited

U.S. PATENT DOCUMENTS

2002/0101416 A1* 8/2002 Woo ..................... G09G 3/3611 345/212
2003/0001810 A1* 1/2003 Yamaguchi .......... G09G 3/3648 345/87
2008/0284775 A1* 11/2008 Shen .................... G09G 3/3611 345/214
2009/0237423 A1* 9/2009 Shih ..................... G09G 3/3406 345/102

* cited by examiner

*Primary Examiner* — Nan-Ying Yang
(74) *Attorney, Agent, or Firm* — Fish & Richardson P.C.

(57) ABSTRACT

A display device includes a memory configured to store gamma sets set for luminances and driving frequencies of images and temperature correction lookup tables set for temperatures, a gamma set selector configured to select a gamma set according to a luminance and a driving frequency of an externally input image, and a temperature corrector configured to select a temperature correction lookup table according to a result of detection of temperature information of a display panel displaying the image and to reflect an offset for each gamma tab stored in the temperature correction lookup table in a gamma reference voltage for each gamma tab stored in the gamma set to generate a corrected gamma set.

8 Claims, 10 Drawing Sheets

DISPLAY DEVICE AND METHOD OF DRIVING SAME

CROSS-REFERENCE TO RELATED APPLICATION

This application claims the priority of Korean Patent Application No. 10-2022-0171816, filed on Dec. 9, 2022, which is hereby incorporated by reference in its entirety.

BACKGROUND

Field of the Disclosure

The present disclosure relates to a display device and a method of driving the same.

Description of the Background

Display devices such as light emitting display devices, quantum dot display devices, and liquid crystal display devices may display images by transmitting light to sub-pixels formed in display panels or causing the sub-pixels to directly emit light.

Light emission characteristics of such sub-pixels formed in a display panel change according to temperature. Since heat is generated during operation of a display device, a method for ensuring image quality in response to temperature change of a display panel is required.

SUMMARY

Accordingly, the present disclosure is directed to a display device and a method of driving the same that substantially obviate one or more of problems due to limitations and disadvantages described above.

More specifically, the present disclosure is to provide a display device and a method of driving the same capable of improving image quality by correcting image data according to characteristics of a display panel that vary according to temperature.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described herein, a display device includes a memory configured to store gamma sets set for luminances and driving frequencies of images and temperature correction lookup tables set for temperatures, a gamma set selector configured to select a gamma set according to a luminance and a driving frequency of an externally input image, and a temperature corrector configured to select a temperature correction lookup table according to a result of detection of temperature information of a display panel displaying the image and to reflect an offset for each gamma tab stored in the temperature correction lookup table in a gamma reference voltage for each gamma tab stored in the gamma sets to generate a corrected gamma set.

The gamma sets may include information on gamma reference voltages set for respective gamma tabs set depending on gray levels of R, G, and B colors according to the luminances and driving frequencies.

The temperature correction lookup tables may include offsets of gamma reference voltages for respective gamma tabs set depending on gray levels of R, G, and B colors in response to reference temperatures.

The memory may include two or more temperature correction sets including a plurality of temperature correction lookup tables set for a plurality of reference temperatures, and different offsets may be set for the same gamma tab at the same temperature in the temperature correction sets.

The temperature corrector may be configured to select a temperature correction set for each gamma tab of the gamma sets and to correct a gamma reference voltage for each gamma tab of the gamma sets on the basis of temperature correction lookup tables included in the temperature correction set.

At least one of temperature correction sets set for respective gamma tabs of the gamma sets may be different from temperature correction sets set for other gamma tabs.

The display device may further include a digital gamma reference voltage generator configured to divide a voltage between a first reference voltage and a second reference voltage into a plurality of voltages and to output the divided voltages through a plurality of output terminals, wherein information on output terminals of the digital gamma reference voltage generator through which the gamma reference voltages set for the respective gamma tabs are output may be stored in the gamma sets.

The temperature correction lookup tables may include offsets for correcting the output terminals of the digital gamma reference voltage generator set for the respective gamma tabs.

In another aspect of the present disclosure, a method of driving a display device includes storing gamma sets set for luminances and driving frequencies of images and temperature correction lookup tables set for temperatures, selecting a gamma set according to a luminance and a driving frequency of an externally input image, selecting a temperature correction lookup table according to a result of detection of temperature information of a display panel displaying the image, and reflecting an offset of a gamma reference voltage for each gamma tab stored in the temperature correction lookup table in the gamma reference voltage for each gamma tab stored in the gamma sets to generate a corrected gamma set.

Here, the method may further include storing two or more temperature correction sets including a plurality of temperature correction lookup tables set for a plurality of reference temperatures in advance, wherein different offsets may be set for the same gamma tab at the same temperature in the temperature correction sets.

The selecting of a temperature correction lookup table according to a result of detection of temperature information of a display panel displaying the image may include selecting the temperature correction set for each gamma tab of the gamma sets, and selecting a temperature correction lookup table corresponding to the result of detection of the temperature information from among the plurality of temperature correction lookup tables included in the temperature correction set.

At least one of temperature correction sets set for respective gamma tabs of the gamma sets may be different from temperature correction sets set for other gamma tabs.

The method may further include dividing a voltage between a first reference voltage and a second reference voltage into a plurality of voltages and outputting the divided voltages through a plurality of output terminals, wherein information on output terminals of a digital gamma reference voltage generator through which the gamma reference voltages set for the respective gamma tabs are output may be stored in the gamma sets.

The temperature correction lookup tables may include offsets for correcting the output terminals of the digital gamma reference voltage generator set for the respective gamma tabs.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

The advantages, features and methods for accomplishing the same of the present disclosure will become more apparent through the following detailed description with respect to the accompanying drawings. However, the present disclosure is not limited by aspects described below and is implemented in various different forms, and the aspects are provided so that this disclosure will be thorough and complete, and will fully convey the scope of the disclosure to those skilled in the art. The present disclosure is defined by the scope of the claims.

Shapes, sizes, ratios, angles, numbers, etc. shown in the figures to describe aspects of the present disclosure are exemplary and thus are not limited to particulars shown in the figures. Like numbers refer to like elements throughout the specification. It will be further understood that, when the terms “include,” “have” and “comprise” are used in the present disclosure, other parts may be added unless “~ only” is used. An element described in the singular form is intended to include a plurality of elements unless context clearly indicates otherwise.

In interpretation of a component, the component is interpreted as including an error range unless otherwise explicitly described.

It will be understood that, when an element is referred to as being “on,” “above,” “under” or “by” another element, it may be “directly” on or under another element or may be “indirectly” formed such that an intervening element is also present.

In the following description of the aspects, “first” and “second” are used to describe various components, but such components are not limited by these terms. The terms are used to discriminate one component from another component. Accordingly, a first component mentioned in the following description may be a second component within the technical spirit of the present disclosure.

Like numbers refer to like elements throughout the specification. Hereinafter, aspects of the present disclosure will be described in detail with reference to the attached drawings. In the following description, if a detailed description of known techniques associated with the present disclosure would unnecessarily obscure the gist of the present disclosure, detailed description thereof will be omitted.

A display device according to the present disclosure may be realized by a television system, a video player, a personal computer (PC), a home theater, a vehicle electric apparatus, and a smartphone, but the present disclosure is not limited thereto. The display device according to the present disclosure may be realized by a light emitting display device (LED), a quantum dot display device (QDD), a liquid crystal display device (LCD), or the like. However, a light emitting display device that directly emits light based on inorganic light emitting diodes or organic light emitting diodes will be described as an example for convenience of description.

Figure 1:
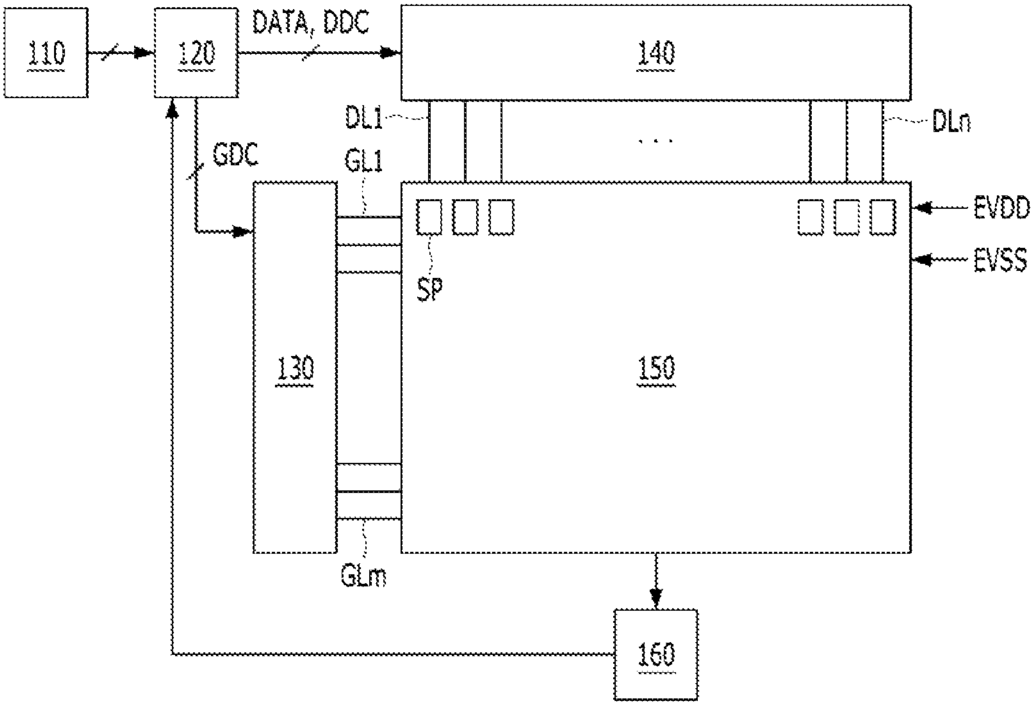
FIG. 1 is a diagram showing a display device according to an aspect of the present disclosure.
Figure 2:
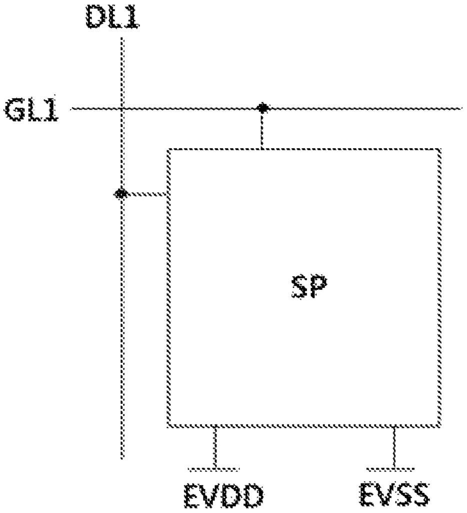
FIG. 2 is a diagram showing an aspect of one pixel included in a display panel.

FIG. 1 is a diagram showing a display device according to an aspect of the present disclosure, and FIG. 2 is a diagram showing an aspect of one pixel included in a display panel.

Referring to FIGS. 1 and 2, the display device may include an image provider 110, a display panel 150, a timing controller 120, a scan driver 130, a data driver 140, a temperature sensor 160, and the like.

The image provider 110 may output various driving signals along with an externally supplied image data signal or an image data signal stored in an internal memory. The image provider 110 may supply data signals and various driving signals to the timing controller 120.

The display panel 150 displays an image according to driving signals including a scan signal and a data voltage. The display panel 150 includes a plurality of sub-pixels SP disposed at intersections of a plurality of gate lines GL1 to GLm and a plurality of data lines DL1 to DLn in a matrix form. For example, one sub-pixel SP may be connected to a first data line DL1, a first gate line GL1, a first power line EVDD, and a second power line EVSS and may emit light according to a data voltage applied to the first data line DL1. These sub-pixels SP include thin film transistors (TFTs) for driving and organic light emitting diodes (OLEDs) emitting red (R), green (G), blue (B), and white (W) light. Three red (R), green (G), and blue (B) subpixels SP disposed adjacent to each other or four subpixels SP including a white (W) sub-pixel are driven as one unit pixel. A unit pixel may display one unit image by mixing red image data, green image data, and blue image data.

The temperature sensor 160 detects the temperature of the display panel 150 through at least one temperature sensor. The temperature sensor may be disposed in a non-display area of the display panel 150 where the sub-pixels SP are formed or on the rear surface of the display panel 150 and measure the temperature of the display panel 150 during operation of the display device.

The timing controller 120 may output a gate timing control signal GDC for controlling the operation timing of the scan driver 130, a data timing control signal DDC for controlling the operation timing of the data driver 140, and synchronization signals such as a vertical synchronization signal and a horizontal synchronization signal. The timing controller 120 may supply the data timing control signal DDC and externally supplied image data DATA to the data driver 140 for image display.

The scan driver 130 may output a scan signal in response to the gate timing control signal GDC supplied from the timing controller 120. The scan driver 130 may supply scan signals to the subpixels SP included in the display panel 150 through the gate lines GL1 to GLm. The scan driver 130 may be implemented in the form of an IC or directly formed on the display panel 150 in a gate-in-panel structure, but is not limited thereto.

In response to the data control signal DDC supplied from the timing controller 120, the data driver 140 may convert digital image data DATA into a data voltage that is an analog signal and supply the converted data voltage to the data lines DL1 to DLn. The data driver 140 converts the digital image data DATA into a data voltage that is an analog signal using a gamma reference voltage supplied from a reference voltage provider. The gamma reference voltage may be set according to the luminance, driving frequency, and the like of the digital image data DATA, and gamma reference voltages ascertained through a preliminary test may be generated as a gamma set and stored in the data driver 140 in advance. According to an aspect of the present disclosure, the data driver 140 may correct the gamma set according to temperature information of the display panel 150 acquired by the temperature sensor 160 and convert the digital image data DATA into a data voltage that is an analog signal according to the corrected gamma set.

The data driver 140 may be implemented in the form of an integrated circuit (IC) and mounted on the display panel 110 or mounted on a printed circuit board. The data driver 140 may also be implemented in the form of a timing controller merged driver IC (TMIC) such that it may perform the functions of the timing controller 120 and the data driver 140 together, but is not limited thereto.

In the above description, components such as the timing controller 120, the scan driver 130, and the data driver 140 may be integrated or separated into one or more ICs according to the implementation method of the display device.

Figure 3:
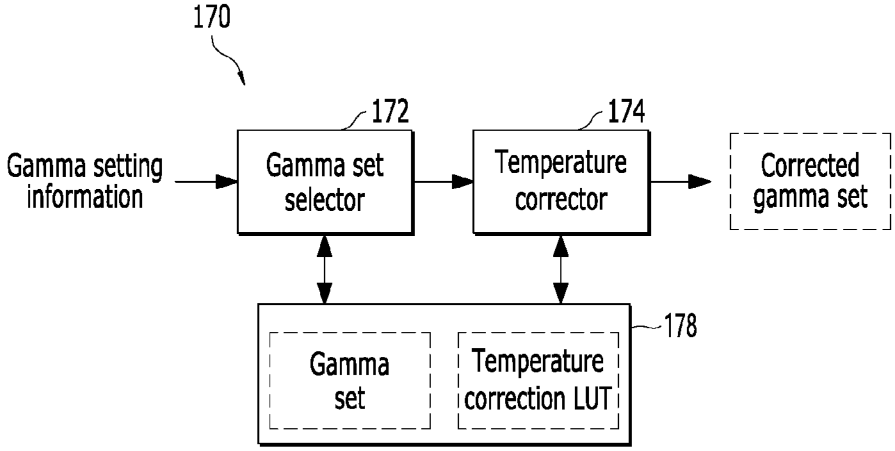
FIG. 3 is a diagram showing an example of a configuration of a gamma set correction device according to an aspect of the present disclosure.

FIG. 3 is a diagram showing an example of a configuration of a gamma set correction device 170 that corrects a gamma set according to temperature change. The gamma set correction device 170 may include a gamma set selector 172, a temperature corrector 174, and a memory 178.

The memory 178 stores a gamma set selected depending on the luminance and frame driving frequency of image data DATA, and a temperature correction lookup table (LUT) selected depending on temperature information.

Gamma reference voltages for gamma tabs set in response to R, G, and B data gray levels may be stored in a gamma set. The gamma set may be stored for each luminance and each frame driving frequency of the image data DATA.

Since organic light emitting diodes (OLEDs) emitting red (R), green (G), blue (B), and white (W) lights have different luminous efficacies for the respective colors due to material characteristics, the amount of driving current required to realize the same gray level is different for each of the R, G and B subpixels SP. Accordingly, necessary gamma reference voltages may be stored in a gamma set according to gamma tabs for the colors R, G, and B. Further, in an organic light emitting diode (OLED) display device, if the frame driving frequency of input image data DATA changes, threshold voltage sampling of a driving TFT in each of the subpixels SP varies, and thus the luminance changes. Accordingly, R, G, and B gamma reference voltages may be determined according to the luminance and the frame driving frequency of the image data DATA. Therefore, the gamma set may be stored for each luminance of the image data DATA and for each frame driving frequency of the image data DATA.

Offset values for correcting a gamma reference voltage for each gamma tab of a gamma set depending on the temperature of the display panel 150 are stored in a temperature correction LUT. When the temperature of the display panel 150 fluctuates, the light emission characteristics of the sub-pixels SP change and thus the luminance changes. Accordingly, the gamma set correction device 170 according to an aspect of the present disclosure stores temperature correction LUTs for correcting gamma reference voltages in response to temperature and corrects the gamma reference voltages in response to temperature.

Data stored in a gamma set and a temperature correction LUT will be described in detail later with reference to the drawings.

The gamma set selector 172 selects a gamma set corresponding to input gamma setting information from gamma sets stored in the memory 178 according to the gamma setting information input from the timing controller 120. The gamma setting information may include the luminance, frame driving frequency, and temperature information of image data DATA. The gamma set selector 172 selects a gamma set corresponding to the luminance and frame driving frequency of the image data DATA. In the selected gamma set, gamma reference voltages for R, G, and B gamma tabs are stored.

The temperature corrector 174 selects a temperature correction LUT corresponding to the temperature information included in the gamma setting information. Offset values for correcting the gamma reference voltages for the R, G, and B gamma tabs may be stored in the temperature correction LUT. The temperature corrector 174 reflects offsets of the temperature correction LUT selected according to the temperature information in the gamma set selected by the gamma set selector 172 to generate and output a corrected gamma set.

Thereafter, the data driver 140 may convert the digital image data DATA into a data voltage that is an analog signal by applying a gamma reference voltage according to the corrected gamma set. Here, a digital gamma reference voltage generator may be applied as the gamma reference voltage provider that outputs the gamma reference voltage.

Figure 4:
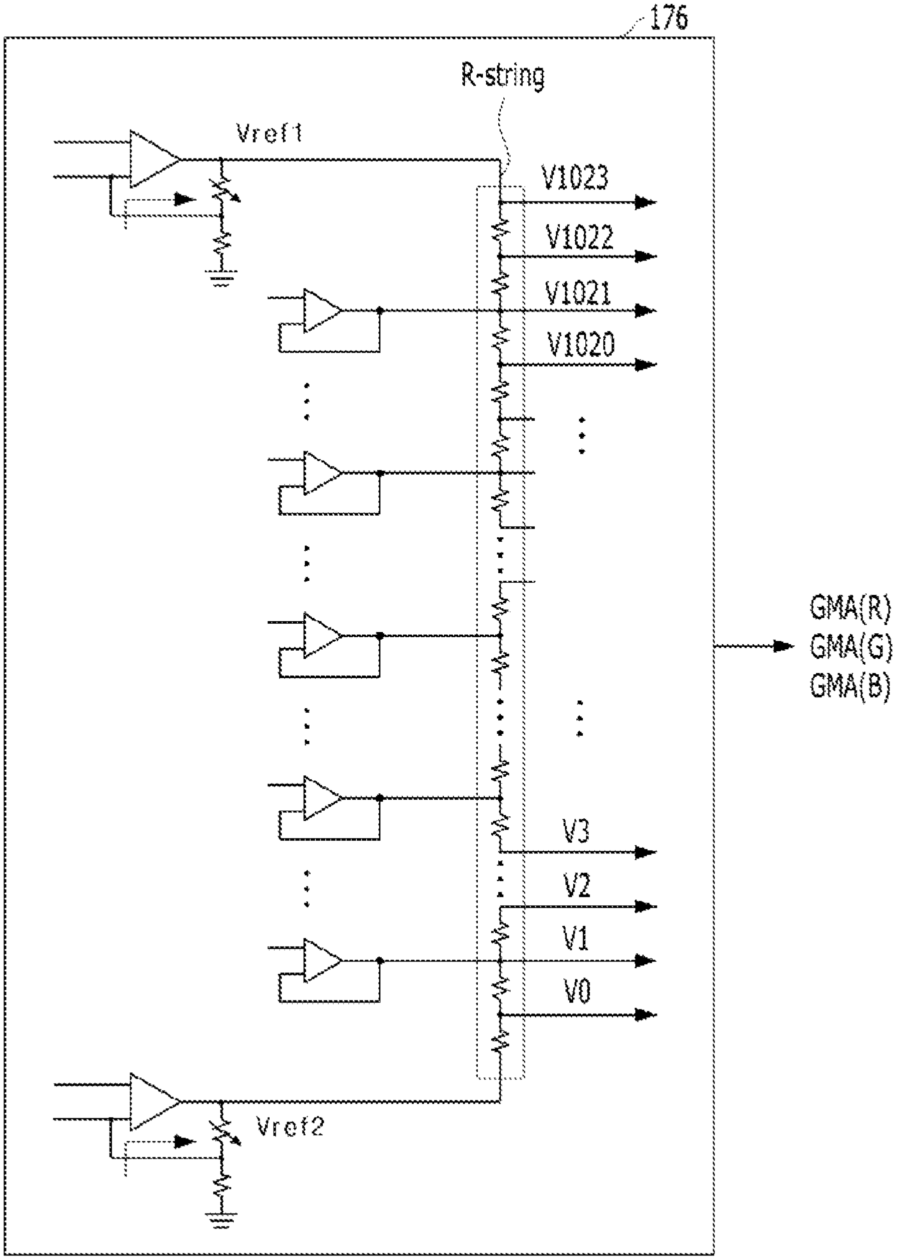
FIG. 4 is a diagram showing an example of a configuration of a digital gamma reference voltage generator applied to the display device according to an aspect of the present disclosure.

FIG. 4 is a diagram showing an example of a configuration of a digital gamma reference voltage generator 176.

The digital gamma reference voltage generator 176 may include a plurality of logic elements and a resistance string R-String for dividing a voltage between a first reference voltage Vref1 and a second reference voltage Vref2 in a voltage range set by the first reference voltage Vref1 and the second reference voltage Vref2. The digital gamma reference voltage generator 176 may output a plurality of voltages V0 to V1023 divided by the plurality of logic elements and the resistance string R-String.

The voltages V0 to V1023 that may be output by the digital gamma reference voltage generator 176 have sufficiently high resolution. Therefore, even if the gamma reference voltage generator 176 is not provided for each of R, G, and B colors, only the digital gamma reference voltage generator 176 composed of one gamma reference voltage generation block or chipset may be provided, and outputs thereof may be used as an R gamma reference voltage GMA (R), a G gamma reference voltage GMA (G), and a B gamma reference voltage GMA (B).

The digital gamma reference voltage generator 176 may be configured as an internal block of the data driver 140 or as a separate independent block, but is not limited thereto.

Figure 5:
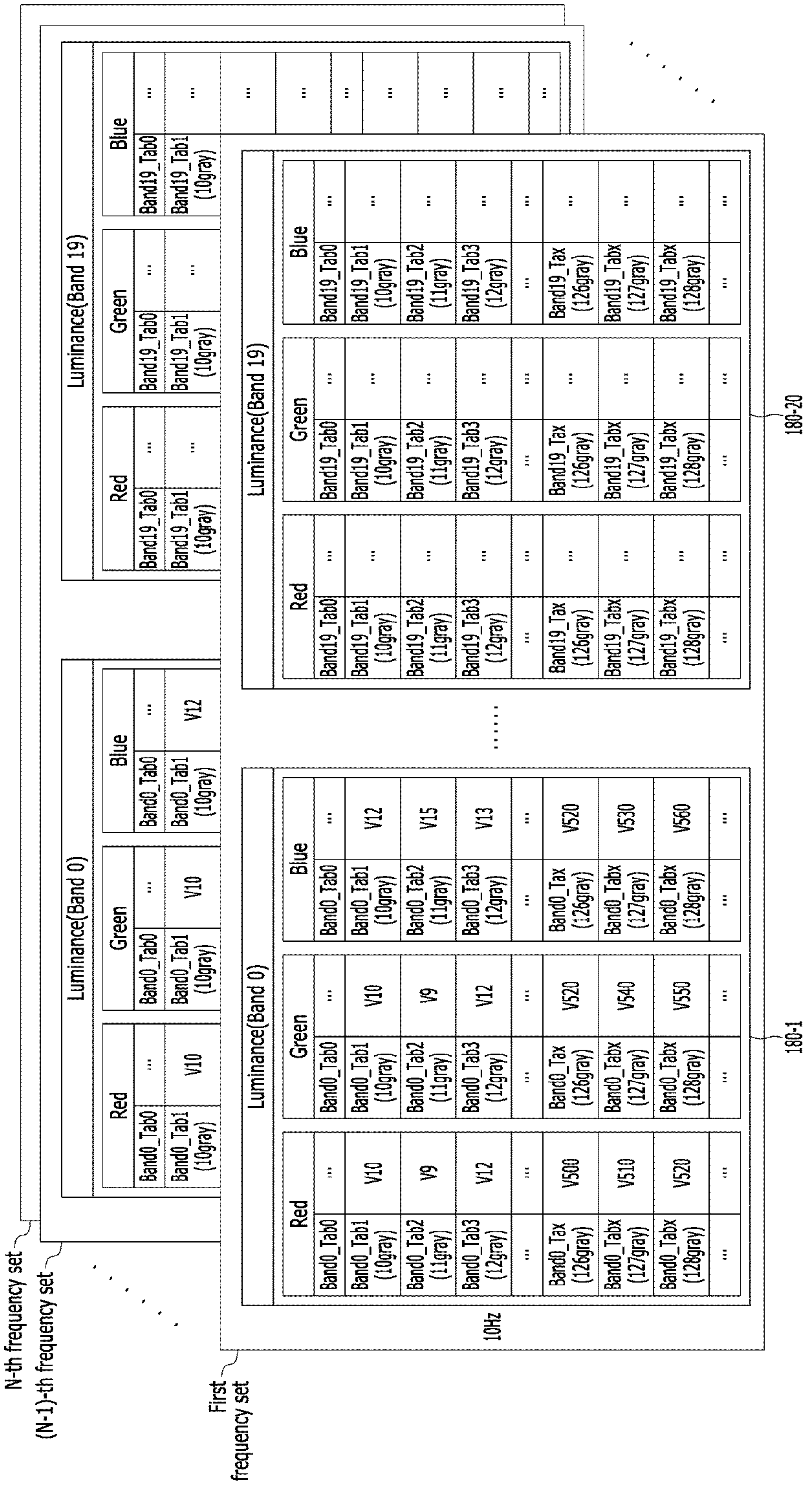
FIGS. 5 and 6 are diagrams for describing a gamma set according to an aspect of the present disclosure.
Figure 6:
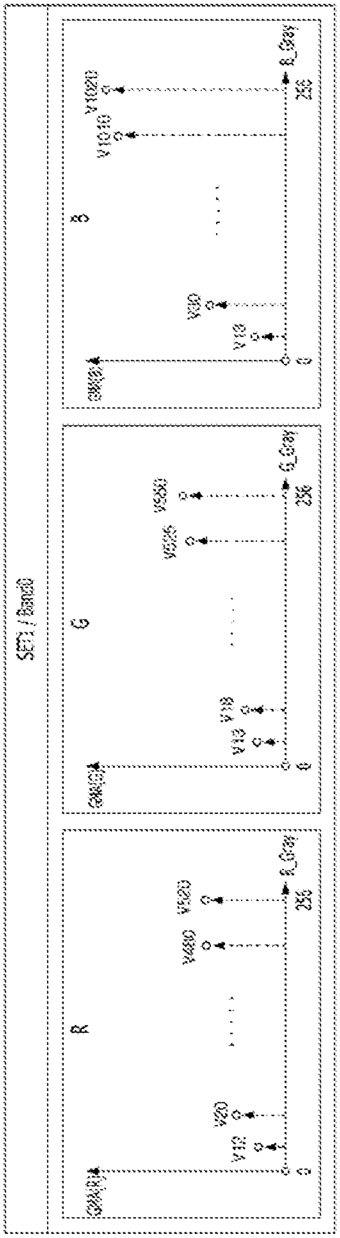

FIGS. 5 and 6 are diagrams for describing gamma sets according to an aspect of the present disclosure. FIG. 5 is a diagram illustrating a data structure of gamma sets, and FIG. 6 is graphs schematically showing gamma reference voltages output according to the gamma sets of FIG. 5.

Gamma sets according to luminances and frame driving frequencies of image data DATA may be stored in the memory 178 of the gamma set correction device 170.

In a gamma set, information on output terminals V0 to V1023 that output gamma reference voltages GMA (R), GMA (G), and GMA (B) necessary to represent gray levels corresponding to R, G, and B gamma tabs may be stored. In the gamma sets of FIG. 5, tab points are set in units of 10 Gray to 1 Gray, but this is merely an example for explanation and the R, G, and B gamma tabs may be set in units of predetermined gray levels. According to the gamma sets of FIG. 5, a gamma tab Tab1 of R corresponds to 10 Gray of R, and to represent this gray level, an output voltage V11 of the digital gamma reference voltage generator 176 is set to the gamma reference voltage GMA (R). A gamma tab Tab2 of R corresponds to 11 Gray of R and an output voltage V10 is set to the gamma reference voltage GMA (R). Output points of the digital gamma reference voltage generator 176 are set for the subsequent gamma tabs of R. As to color G, a gamma tab Tab1 of G corresponds to 10 Gray, and to represent this gray level, the output voltage V10 of the digital gamma reference voltage generator 176 is set to the gamma reference voltage GMA (G).

As shown in FIG. 5, the gamma reference voltages GMA(R), GMA(G), and GMA(B) may be stored as gamma sets 180-1 to 180-20 for respective luminance bands Band 0 to Band 19 obtained by dividing the luminance of image data DATA into 20 sections.

In addition, if the frame driving frequency of input image data DATA is changed, required gamma reference voltages are also changed. Accordingly, the gamma sets for the respective luminance bands Band 0 to Band 19 may be provided for respective driving frequencies. For example, the frame driving frequency of the image data DATA may be set to a first frequency to an N-th frequency, and gamma sets for respective luminance bands Band 0 to Band 19 for each frequency may be stored. A first frequency set in FIG. 5 shows that gamma sets 180-1 to 180-19 for respective luminance bands Band 0 to Band 19 are stored when the frame driving frequency of the image data DATA is 10 Hz.

FIG. 6 is graphs schematically showing output of the gamma set 180-1 in the frequency band Band 0 in the first frequency set shown in FIG. 5.

In the gamma set 180-1, one of the output points V0 to V1023 of the digital gamma reference voltage generator 176 is set to each of the R, G, and B gamma tabs. Accordingly, the output voltage of the output point of the digital gamma reference voltage generator 176 set to each gamma tab is set as the gamma reference voltage of the corresponding gamma tab.

As described above, gamma sets may be set according to the frame driving frequency and luminance of image data DATA. The gamma reference voltages set to each of the R, G, and B gamma tabs may be set as information on the output points V0 to V1023 of the digital gamma reference voltage generator 176 from which voltages having magnitudes corresponding thereto are output. Data stored in such gamma sets may be preset experimental values capable of optimizing the image quality of the display device.

Figure 7:
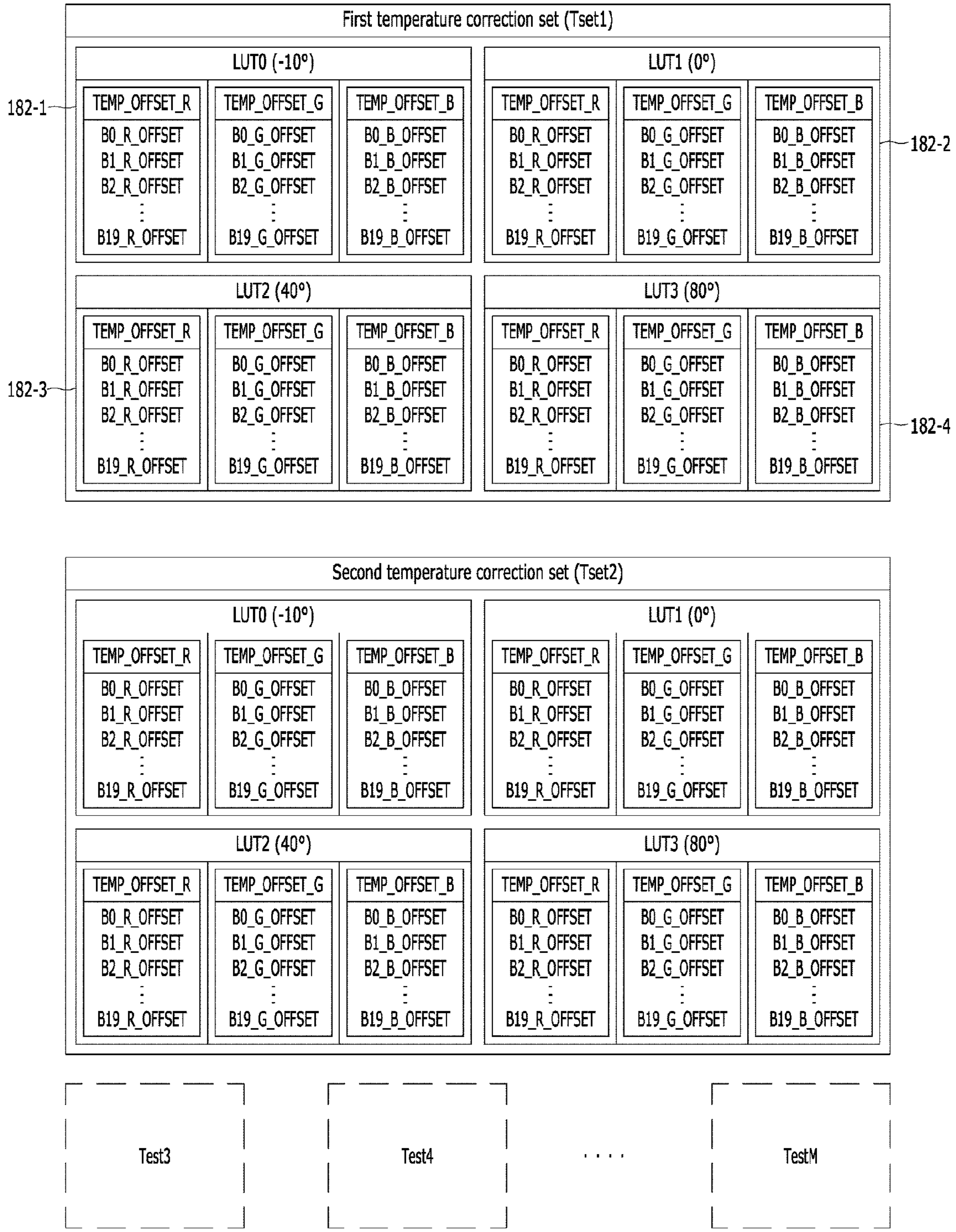
FIGS. 7 and 8 are diagrams for describing temperature correction lookup tables according to an aspect of the present disclosure.
Figure 8:
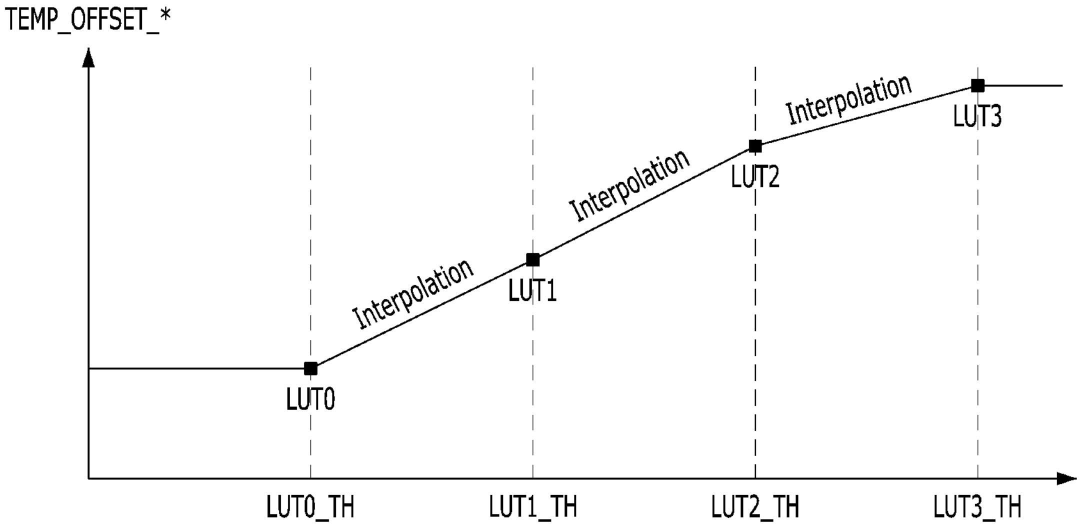

FIGS. 7 and 8 are diagrams for describing a temperature correction LUT according to an aspect of the present disclosure. FIG. 7 is a diagram illustrating a data structure of a temperature correction set Tset composed of a temperature correction LUT and a LUT for each reference temperature according to an aspect of the present disclosure, and FIG. 8 is a diagram for describing the principle of interpolation for estimating an offset of an intermediate temperature.

Temperature correction LUTs for correcting gamma sets depending on the temperature of the display panel 110 may be stored in the memory 178 of the gamma set correction device 170. The temperature correction LUT according to the aspect of the present disclosure may store offsets for correcting gamma reference voltages for the R, G, and B gamma tabs of the gamma sets at a reference temperature. In the gamma sets, gamma reference voltages for the R, G, and B gamma tabs may be stored as information on the output points V0 to V1023 of the digital gamma reference voltage generator 176. Accordingly, the offset stored in temperature correction LUTs may be values for correcting the output points of the digital gamma reference voltage generator 176. For example, if an offset is set to +20, V100 set in a gamma set may be corrected to V120. As the output point is changed from V100 to V120, the gamma reference voltage may be corrected by the difference between the output voltages of V100 and V120.

A temperature correction LUT is provided for each predetermined reference temperature. For example, LUT0 applied in the case of a reference temperature of −10° C., LUT1 applied in the case of a reference temperature of 0° ° C., LUT2 applied in the case of a reference temperature of 40° C., and LUT3 applied in the case of a reference temperature of 80° C. may be stored, and a corresponding temperature correction LUT may be selected from among LUT0, LUT1, LUT2, and LUT3 in response to temperature information detected through the temperature sensor 160 and corrected.

If the temperature detected by the temperature sensor 160 is an intermediate temperature between reference temperatures, an offset at the intermediate temperature may be estimated through interpolation using offsets of two LUTs. Referring to FIG. 8, LUT0, LUT1, LUT2, and LUT3 store offsets for R, G, and B gamma tabs at reference temperatures LUTO_TH, LUT1_TH, LUT2_TH, and LUT3_TH. If a temperature between the reference temperatures LUT0_TH, LUT1_TH, LUT2_TH, and LUT3_TH is detected, offsets are regarded as linearly changing in response to temperature change and a value between the offsets may be estimated using interpolation and applied. For example, if the temperature of the display panel is detected as an intermediate temperature between LUT1_TH and LUT2_TH, values between the offsets set in LUT1 and LUT2 may be calculated by interpolation to estimate offsets at the intermediate temperature. Offsets at a temperature lower than LUT0_TH, which is the lowest reference temperature, may be estimated by applying the values of LUT0 as they are or by modeling a linear variation trend between a temperature and offsets with a formula. Offsets at a temperature higher than LUT3_TH, which is the highest reference temperature, may also be estimated by applying the values of LUT3 as they are or by modeling with a formula.

As described above, in the temperature correction LUT according to the aspect of the present disclosure, an offset is set for each of the R, G, and B gamma tabs depending on the temperature of the panel. Accordingly, in gamma correction depending on temperature, precise correction is possible because all R, G, and B gamma tabs may be individually corrected.

In addition, the aspect of the present disclosure may configure one temperature correction set Tset such that it includes LUT0, LUT1, LUT2, and LUT3 and configure other temperature correction sets including LUTs having different offsets at the same reference temperature to obtain a plurality of temperature correction sets Tset 1 to Tset 4, and store and apply the temperature correction sets Tset 1 to Tset 4. For example, the first temperature correction set Tset1 may include LUT0 (182-1) applied in the case of −10° C., LUT1 (182-2) applied in the case of 0° C., LUT2 (182-3) applied in the case of 40° C., and LUT3 (182-4) applied in the case of 80° C. The second temperature correction set Tset2 may also include LUT0, LUT1, LUT2, and LUT3 applied in the case of −10° ° C., 0° C., 40° C., and 80° C. However, different offsets are set to LUT0, LUT1, LUT2, and LUT3 included in the second temperature correction set Tset2 and LUT0 (182-1), LUT1 (182-2), LUT2 (182-3), and LTU3 (182-4) included in the first temperature correction set Tset1 even though they are LUTs applied at the same reference temperature. In the same way, temperature correction sets Tset3, Tset4, . . . , TsetM may be composed of temperature correction LUTs having different offsets under the same reference temperature condition. The temperature correction sets Tset1 to TsetM may be configured using offsets obtained through experiments targeting a plurality of display devices.

When a plurality of temperature correction sets Tset1 to TsetM has been stored, temperature correction LUTs included in different temperature correction sets (Tset) may be applied for each gamma tab for correction. For example, if a detected panel temperature is 40° ° C., correction may be performed for gamma tab Tab1 of R according to temperature correction LUT2 corresponding to 40° C. in Tset1 and correction may be performed for gamma tab Tab2 of R according to temperature correction LUT2 corresponding to 40° C. in Tset2. Since the light emission characteristics of display panels may differ according to process variations, and the like, the correction accuracy may be enhanced by applying offsets of temperature correction sets Tset1 to TsetM suitable for each gamma tab according to the characteristics of each display panel. Temperature correction sets Tset1 to TsetM suitable for each gamma tab may be ascertained and set through a preliminary test.

As described above, according to the temperature correction LUT according to the aspect of the present disclosure, correction may be performed by individually applying offsets for each of the R, G, and B gamma tabs, and thus precise correction may be achieved. In addition, since different temperature correction sets Tset may be applied for respective R, G, and B gamma tabs using the temperature correction sets Tset1 to TsetM to which different offsets are set at the same reference temperature, various correction values may be applied depending on the characteristics of a display device to enhance temperature correction accuracy. In addition, since reference gamma sets and a plurality of temperature correction sets Tset1 to TsetM are stored and various temperature correction values may be applied by combining the gamma sets and the temperature correction sets, the amount of data stored for gamma correction may be minimized to conserve memory capacity.

Figure 9:
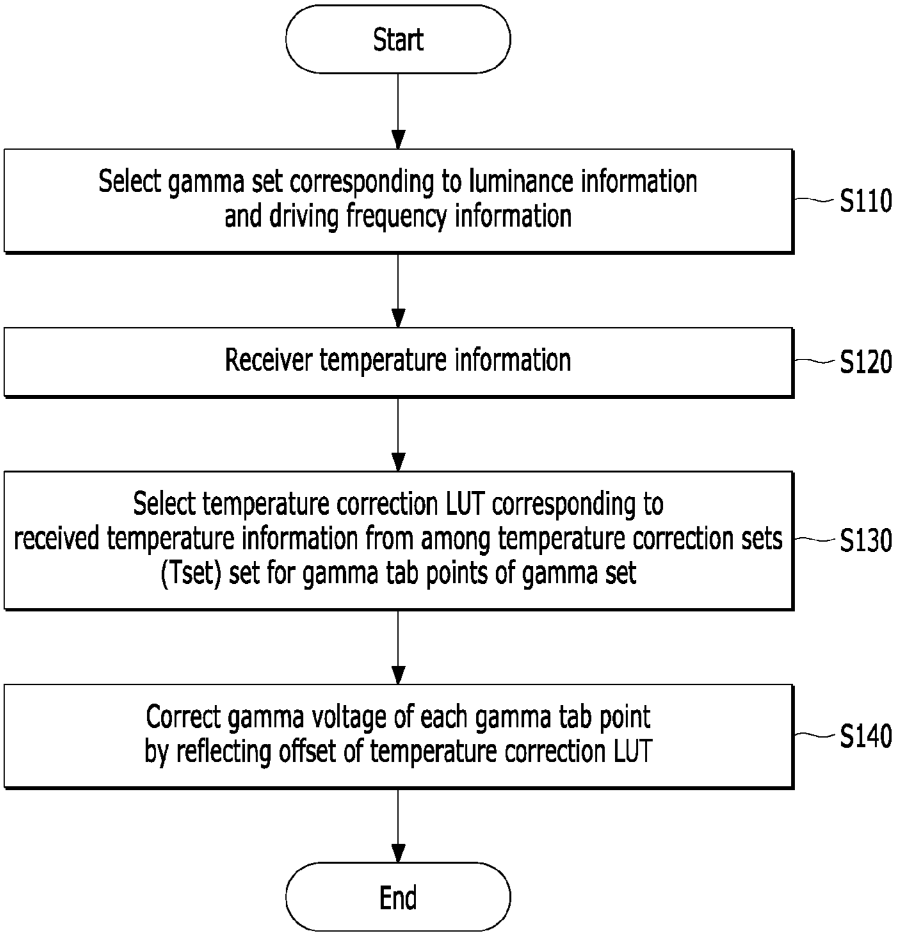
FIG. 9 is a flowchart of a gamma reference voltage generation method according to an aspect of the present disclosure.

A method of correcting gamma reference voltages when a plurality of temperature correction sets Tset1 to TsetM is stored will be described in detail with reference to FIGS. 9 to 11. FIG. 9 is a flowchart of a gamma reference voltage generation method according to an aspect of the present disclosure, and FIGS. 10 and 11 are diagrams for describing a method of correcting gamma reference voltages using gamma sets and temperature correction sets Tset1 and Tset2.

Figure 10:
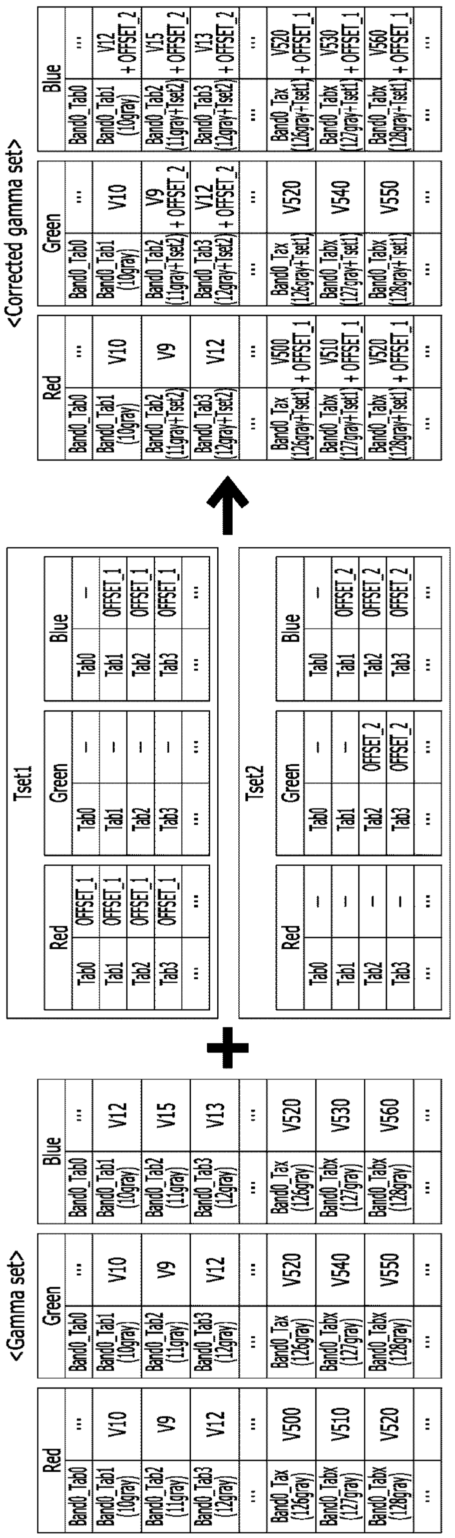
FIGS. 10 and 11 are diagrams for describing the gamma reference voltage generation method according to an aspect of the present disclosure.
Figure 11:
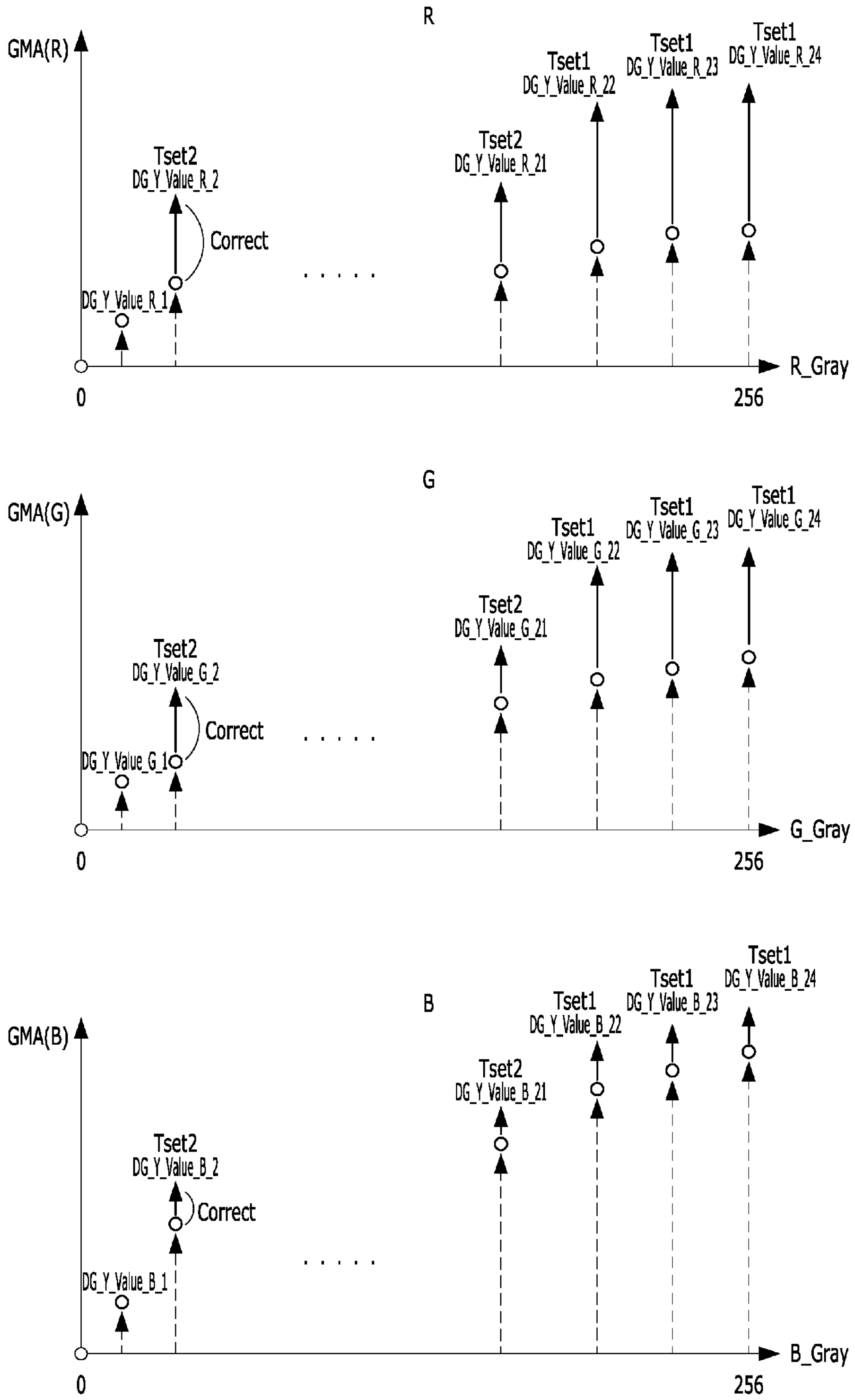

Referring to FIGS. 9 and 10, the gamma set selector 172 of the gamma set correction device 170 selects a gamma set corresponding to luminance information of image data DATA and the frame driving frequency of the image data DATA (S110). The gamma set selected according to the luminance and frame driving frequency may store information on output terminals V0 to V1023 of the digital gamma reference voltage generator 176 outputting gamma reference voltages for R, G, and B gamma tabs.

To correct the gamma reference voltages in response to temperature, the temperature corrector 174 may acquire temperature information detected by the temperature sensor 160 (S120).

A temperature correction LUT corresponding to the received temperature information is selected (S130). Here, the temperature correction LUT is selected from a temperature correction set Tset1 or Tset2 set for each gamma tab of the gamma set selected in step S110.

The gamma reference voltage of each gamma tab is corrected by reflecting offsets of Tset1 or Tset2 to each of the R, G, and B gamma tabs of the gamma set (S140).

Referring to a corrected gamma set shown in FIG. 10, Tab1 of color R is excluded from correction. If correction of a gamma tab is not required at a corresponding temperature, the gamma tab may be excluded. Tset2 is applied to Tab2 and Tab3. According to the LUT for color R of Tset2, no offset is applied to Tab2 and Tab3, and thus the gamma reference voltages of Tab2 and Tab3 are maintained as output voltages of V9 and V12 in the corrected gamma set. Tset1 is applied to gamma tabs corresponding to 126 Gray to 128 Gray, and output voltages are corrected by an offset OFFSET_1 set to Tset1. For example, if OFFSET_1 is set to +3, the gamma reference voltage of the 126-Gray tab is corrected to an output V503, the gamma reference voltage of the 127-Gray tab is corrected to an output V513, and the gamma reference voltage of the 128-Gray tab is corrected to an output V523.

Tab1 of color G is excluded from correction and maintained as an output V10 of the gamma set. Tset2 is applied to Tab2 and Tab3 and thus Tab2 and Tab3 are corrected according to an offset OFFSET_2 set to the LUT for color G of Tset2. For example, if OFFSET_2 is set to +7, the gamma reference voltage of Tab2 is corrected from V9 to V16, and the gamma reference voltage of Tab3 is corrected from V12 to V19.

Tset2 is applied to Tab1 to Tab3 of color B and thus Tab1 to Tab3 are corrected according to an offset OFFSET_2 set to the LUT for color B of Tset2. Accordingly, the gamma reference voltages of Tab1 to Tab3 are corrected by reflecting the offset OFFSET_2 set to Tset2 therein. Tset1 is applied to tab points corresponding to 126 Gray to 128 Gray, and the output voltages are corrected by the offset OFFSET_1 set to Tset1.

FIG. 11 is graphs schematically illustrating output values when the gamma reference voltages for R, G, and B gamma tabs set in a gamma set are corrected in response to temperature.

Temperature correction sets Tset1 and Tset2 to be applied are set for the R, G, and B gamma tabs of the gamma set. Therefore, when temperature correction is performed, offsets set to Tset1 or Tset2 are reflected in the gamma reference voltages set in the gamma set, and thus corrected gamma reference voltages may be output.

As described above, the display device according to the aspect of the present disclosure stores temperature correction LUTs in which offsets are set for each of R, G, and B gamma tabs in response to panel temperature, and corrects a gamma set selected according to a luminance and a driving frequency. Accordingly, in gamma correction in response to temperature, precise correction is possible because all R, G, and B gamma tabs may be individually corrected.

In addition, the aspect of the present disclosure may configure one temperature correction set Tset including a plurality of temperature correction LUTs (LUT0, LUT1, LUT2, and LUT3) and configures other temperature correction sets including LUTs having different offsets at the same reference temperature to obtain a plurality of temperature correction sets Tset 1 to Tset 4, and store and apply the temperature correction sets Tset 1 to Tset 4. In this way, since different temperature correction sets Tset may be applied to the R, G, and B gamma tabs using the temperature correction sets Tset1 to TsetM in which different offsets are set at the same reference temperature, various correction values may be applied according to characteristics of the display device, and thus temperature correction accuracy may be enhanced. In addition, since reference gamma sets and a plurality of temperature correction sets Tset1 to TsetM are stored and various temperature correction values may be applied by combining the gamma sets and the temperature correction sets, the amount of data stored for gamma correction may be minimized and memory capacity may be conserved.

The present aspect has the following effects. According to the present aspect, it is possible to improve temperature correction accuracy by individually correcting gamma reference voltages for R, G, and B gamma tabs in response to panel temperature.

According to the present aspect, it is possible to apply an optimal correction value according to characteristics of a display device to improve temperature correction accuracy by storing temperature correction lookup tables having different offsets at the same reference temperature as a plurality of temperature correction sets and applying different temperature correction sets to gamma reference voltages for R, G, and B gamma tabs to perform correction. In addition, it is possible to conserve memory capacity by minimizing the amount of data stored for gamma correction because reference gamma sets and a plurality of temperature correction sets are stored and various temperature correction values may be applied by combining the reference gamma sets and the temperature correction sets.

Effects according to the present disclosure are not limited by the above description and various more effects are included in the present disclosure.

It will be apparent to those skilled in the art that various modifications and variations can be made in the display device and the method of driving the same of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display device comprising:

at least one temperature sensor configured to detect a temperature information of a display panel;

a memory configured to store gamma sets and temperature correction lookup tables, the gamma sets include gamma reference voltages according to luminances and driving frequencies of images and the temperature correction lookup tables include offsets for correcting the gamma sets depending on the temperature information of a display panel;

a gamma set selector configured to select a gamma set according to a luminance and a driving frequency of an externally input image; and a temperature corrector configured to select a temperature correction lookup table according to a result of detection of temperature information of the display panel displaying the image and to reflect an offset for each gamma tab stored in the temperature correction lookup table in a gamma reference voltage for each gamma tab stored in the gamma set to generate a corrected gamma set, wherein the memory includes two or more temperature correction sets including a plurality of temperature correction lookup tables set for a plurality of reference temperatures, and different offsets are set for the same gamma tab at a same temperature in the temperature correction sets, wherein the temperature corrector is configured to select one of the temperature correction sets for each gamma tab and correct the gamma reference voltage of corresponding gamma tab based on the temperature correction lookup table selected according to the temperature information of a display panel among the temperature correction lookup tables included in the temperature correction set, wherein at least one of temperature correction sets set for respective gamma tabs of the gamma sets is different from temperature correction sets set for other gamma tabs.

2. The display device of claim 1, wherein the gamma sets include information on gamma reference voltages set for respective gamma tabs set depending on gray levels of R, G, and B colors according to the luminances and driving frequencies.

3. The display device of claim 1, wherein the temperature correction lookup tables include offsets of gamma reference voltages for respective gamma tabs set depending on gray levels of R, G, and B colors in response to reference temperatures.

4. The display device of claim 1, further comprising a digital gamma reference voltage generator configured to divide a voltage between a first reference voltage and a second reference voltage into a plurality of voltages and to output the divided voltages through a plurality of output terminals, wherein information on output terminals of the digital gamma reference voltage generator through which the gamma reference voltages set for the respective gamma tabs are output is stored in the gamma sets.

5. The display device of claim 4, wherein the temperature correction lookup tables include offsets for correcting the output terminals of the digital gamma reference voltage generator set for the respective gamma tabs.

6. A method of driving a display device, comprising:

detecting a temperature information of a display panel through at least one temperature sensor;

storing gamma sets and temperature correction lookup tables, the gamma sets include gamma reference voltages according to luminances and driving frequencies of images and the temperature correction lookup tables include offsets for correcting the gamma sets depending on the temperature information of a display panel;

selecting a gamma set according to a luminance and a driving frequency of an externally input image;

selecting a temperature correction lookup table according to a result of detection of temperature information of the display panel displaying the image; and reflecting an offset of a gamma reference voltage for each gamma tab stored in the temperature correction lookup table in the gamma reference voltage for each gamma tab stored in the gamma set to generate a corrected gamma set, further comprising storing two or more temperature correction sets including a plurality of temperature correction lookup tables set for a plurality of reference temperatures in advance, wherein different offsets are set for a same gamma tab at a same temperature in the temperature correction sets;

wherein the selecting of a temperature correction lookup table according to a result of detection of temperature information of a display panel displaying the image comprises:

selecting the temperature correction sets set for each gamma tab of the gamma sets; and selecting a temperature correction lookup table corresponding to the result of detection of the temperature information from among the plurality of temperature correction lookup tables included in the temperature correction sets, wherein at least one of temperature correction sets set for respective gamma tabs of the gamma sets is different from temperature correction sets set for other gamma tabs.

7. The method of claim 6, further comprising dividing a voltage between a first reference voltage and a second reference voltage into a plurality of voltages and outputting the divided voltages through a plurality of output terminals, wherein information on output terminals of a digital gamma reference voltage generator through which the gamma reference voltages set for the respective gamma tabs are output is stored in the gamma sets.

8. The method of claim 7, wherein the temperature correction lookup tables include offsets for correcting the output terminals of the digital gamma reference voltage generator set for the respective gamma tabs.

* * * * *